United States Patent
Menz et al.

(10) Patent No.: US 7,050,837 B2
(45) Date of Patent: May 23, 2006

(54) MOBILE COMMUNICATION TERMINAL APPARATUS INCLUDING MOISTURE DETECTION

(75) Inventors: Wolfgang Menz, Hamminkeln (DE); Thomas Plugge, Rhede (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/503,351

(22) PCT Filed: Jan. 13, 2003

(86) PCT No.: PCT/DE03/00076

§ 371 (c)(1),
(2), (4) Date: Jul. 30, 2004

(87) PCT Pub. No.: WO03/065691

PCT Pub. Date: Aug. 7, 2003

(65) Prior Publication Data

US 2005/0079888 A1    Apr. 14, 2005

(30) Foreign Application Priority Data

Jan. 31, 2002 (DE) .................................. 102 03 814

(51) Int. Cl.
*H04B 1/38* (2006.01)
(52) U.S. Cl. .................. 455/572; 455/550.1; 455/557; 455/466; 455/74.1; 34/380; 34/13; 34/80; 34/595; 34/210; 702/31; 436/2; 360/128; 219/501
(58) Field of Classification Search ............ 455/550.1, 455/572, 557, 466, 74.1; 34/380, 13, 80, 34/595, 210; 702/31; 436/2; 360/128; 219/501
See application file for complete search history.

(56) References Cited

U.S. PATENT DOCUMENTS

| | | | | |
|---|---|---|---|---|
| 5,039,842 A | * | 8/1991 | Kochajda | 219/501 |
| 5,189,581 A | * | 2/1993 | Schroder et al. | 360/128 |
| 5,222,307 A | * | 6/1993 | Oba et al. | 34/417 |
| 6,073,031 A | * | 6/2000 | Helstab et al. | 455/557 |

(Continued)

FOREIGN PATENT DOCUMENTS

JP     2000003715    * 12/2000

(Continued)

OTHER PUBLICATIONS

Patent Abstracts of Japan—2001197175.

*Primary Examiner*—William Trost
(74) *Attorney, Agent, or Firm*—Bell, Boyd & Lloyd LLC

(57) ABSTRACT

A mobile communication terminal device is disclosed having elements for detecting moisture in the device. These elements include the following precautionary features: a memory for recording a circumstance under which the detection of moisture takes place, a shutdown feature for shutting down the mobile communication terminal device at least partially if moisture has been detected, and a feature for determining two circumstances, namely that the mobile communications terminal has been at least partially shut down as a result of a detection of moisture and that the mobile communication terminal device has been connected to an external power supply and subsequent current is being drawn from the power supply. Once these two circumstances have been detected, a mode is activated by which the mobile communication terminal device is subjected to a heating phase and as a result, in turn, to a drying phase.

6 Claims, 1 Drawing Sheet

U.S. PATENT DOCUMENTS

| | | | |
|---|---|---|---|
| 6,240,297 B1 * | 5/2001 | Jadoul | 455/466 |
| 6,760,981 B1 * | 7/2004 | Leap | 34/210 |
| 6,815,207 B1 * | 11/2004 | Yabuki et al. | 436/2 |
| 2002/0072390 A1 * | 6/2002 | Uchiyama | 455/557 |
| 2004/0143989 A1 * | 7/2004 | Theriault et al. | 34/380 |
| 2004/0244215 A1 * | 12/2004 | Greenspan et al. | 34/80 |
| 2005/0049800 A1 * | 3/2005 | Izumo et al. | 702/31 |
| 2005/0050763 A1 * | 3/2005 | Park et al. | 34/595 |

FOREIGN PATENT DOCUMENTS

JP    2001-197175    7/2001

* cited by examiner

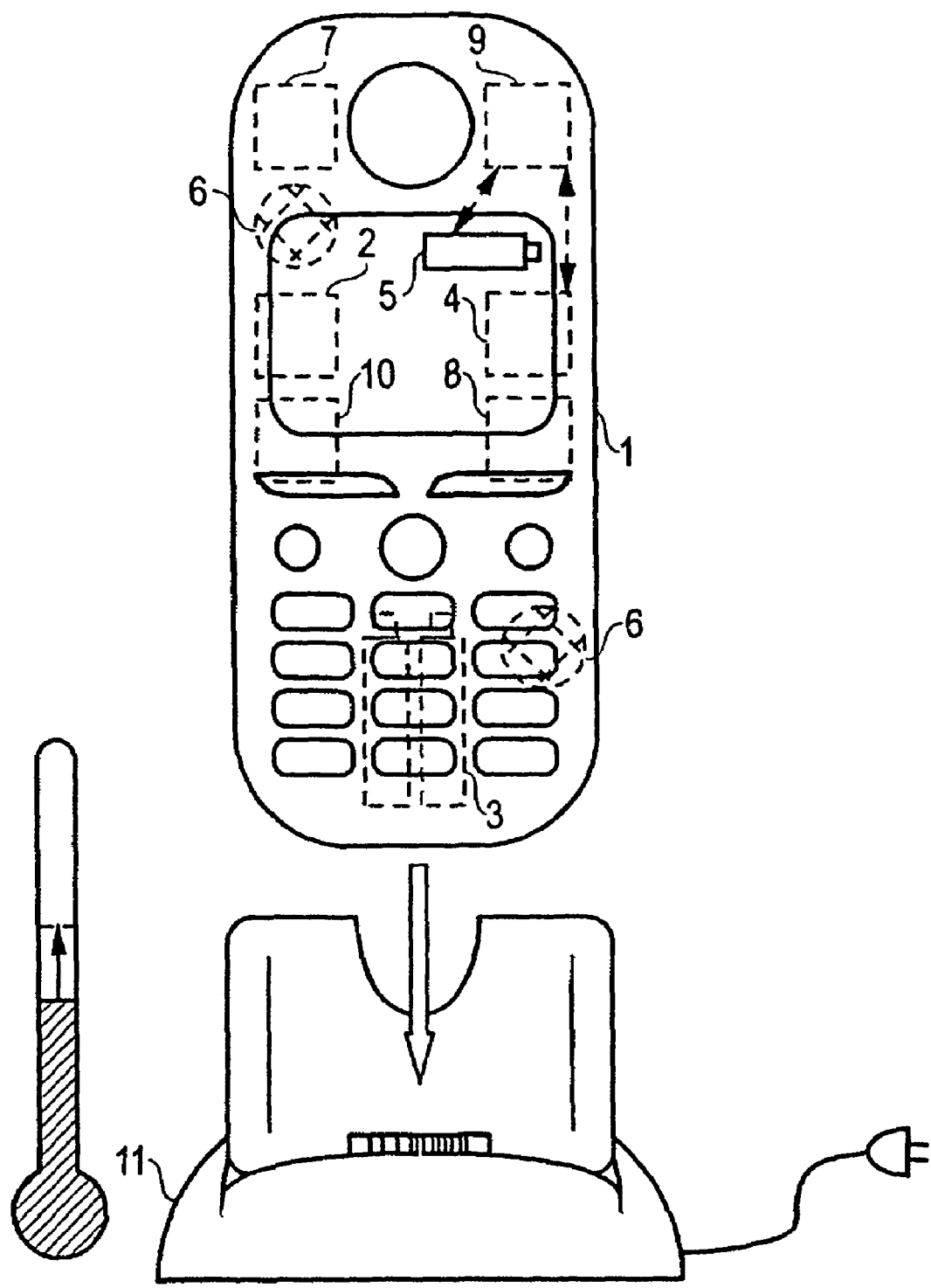

MOBILE COMMUNICATION TERMINAL APPARATUS INCLUDING MOISTURE DETECTION

BACKGROUND

The present disclosure relates to a mobile communication terminal device, and more particularly, a mobile communications device including moisture detection for use in limiting corrosion in the device.

Mobile communication terminal devices repeatedly exhibit corrosion phenomena in the interior of the housing of the device on metallic electrically conducting surfaces. 70 to 80% of complaints from customers about their mobile communication terminal devices arise from such corrosion phenomena.

Not only the keypad surfaces, however, are affected by the corrosion phenomena. Concerning the components of the device, short-circuits are frequently caused by the products resulting from such corrosion. In the case of devices having rubber mats and/or films, in particular, corrosion phenomena can be observed beneath the rubber mat or film on metallic electrically conducting surfaces.

If a liquid containing water comes into contact with a module having an operating voltage of greater than 1.2 Volts, then, as a result of electrolysis, the water becomes strongly alkaline up to a pH value of 14. Within a short time the alkaline liquid destroys the module as a result of corrosion. Contamination on the module can further accelerate this process. When more recent tin/silver/copper solder types are used, this process is accelerated still further. Liquids containing acids can also result in the development of corrosion.

Splash-proof devices, for example, are produced in order to counter the corrosion problem. These devices, however, also do not ultimately escape the corrosion problem.

A method of providing so-called "sacrificial" anodes is known whereby these modes are the first items to be destroyed by the corrosion. In this manner, other sensitive parts remain spared from the corrosion for a time. When the sacrificial anodes have been used up, however, protection against corrosion is no longer provided.

A method is also known of providing heating resistors as a measure offering corrosion protection, whereby a dry environment is generated in the mobile communication terminal device as a result of the heat dissipated by these resistors. A disadvantage of this methodology, however, is the high power consumption of the device.

A further method is known of containing the corrosion through the application of protective coatings prior to assembly of the devices. A disadvantage in this case is the fact that only restricted repair options then remain available for modules. A further disadvantage is the fact that the contact points of the keypads can not be protected in this manner because they would otherwise be insulated and incapable of operation as a result.

A method is also known of applying a coating by an immersion process when there is no need to pay special attention to any contact surfaces.

A further method is known of applying a carbon coating to the key contacts and test points to prevent corrosion in the device. With regard to a large number of devices, however, the use of a carbon coating as protection against corrosion is not possible on account of the packaging density of the components.

Finally, a method is known of designing generously dimensioned contact surfaces in order to delay the effects of the corrosion, such as in the form of an open circuit between the contacts, for example. However, the corrosion can not altogether be prevented in this manner, at least not in its entirety. There is likewise little opportunity to prevent a growing short-circuit resulting from corrosion.

In addition, from Patent Abstracts of Japan, Vol. 2000, No. 24, 11 May 2001 (2001-05-11) and JP 2001 197175 A (Matsushita Electric Ind Co Ltd), 19 Jul. 2001 (2001-07-19) a mobile communication terminal device is known that includes elements for detecting moisture in the mobile communication terminal device and a memory feature for recording the circumstances under which the detection of moisture takes place.

SUMMARY

The present disclosure, features an apparatus for use in a device such as a mobile communication terminal device of the type mentioned at the beginning, employing technical measures that serve to greatly slow down or even completely prevent corrosion phenomena in the mobile communication terminal device.

An example of an apparatus for use in a mobile communication terminal is disclosed including a moisture detection element configured to detect moisture in the mobile communication terminal device. The apparatus also includes a memory to record circumstances under which the detection of moisture takes place, a first shutdown element configured to at least partially shut down the mobile communication terminal device when moisture has been detected, and a control element configured to determine a first even where an at least partial shutdown of the mobile communication terminal device has been performed by the first shutdown element as a result of moisture being detected, and a second even where the mobile communication terminal device is connected to an external power supply source and current is being drawn from the power supply source; and, upon detection of the first and second events, activate a mode to cause the mobile communication terminal device through the drawing of current to be subjected to a heating phase and a subsequent drying phase.

Through the use of appropriate moisture sensors, the mobile communication terminal device is capable of actively detecting moisture in the device, for example, and shutting down the device, at least partially, when moisture is detected. In this situation, the device does not need to be shut down immediately in the event that moisture is detected if there are reasons justifying a later shutdown. Such a reason could, for example, be the fact that a subscriber call is currently connected at the time when moisture is detected. Thus, the end of such a subscriber call should in such as case be awaited. To this end, it is necessary for the mobile communication terminal device to be capable of storing the event of moisture being detected. A memory feature is provided for this purpose and is used to accomplish such an operation. A shutdown element operating in a suitable manner is then provided for shutting down the mobile communication terminal device in an appropriate manner.

Active moisture detection is understood, for example as the case where elements are provided that will assume changed physical properties in their environment depending on a moisture value, Depending on which physical properties corresponding by change, for example, such as with respect to resistances, capacitances, inductances and/or frequencies, these values can then be interrogated and, thereby, also be monitored. Such a monitoring facility could, for example, be implemented by an appropriate processor control unit.

In accordance with the disclosed apparatus, a further precautionary feature is provided by which the coincidence of two circumstances, (i.e., that the mobile communication terminal device has at least partially been shut down as a result of moisture being detected and that the mobile communication terminal device has been connected to an external power supply source) subsequently causing current to be drawn from the power supply source, can be determined. If a partial shutdown of the mobile communication terminal device occurs as a result of the detection of moisture (i.e., at least such partial circuit components that carry out the continuous monitoring of the existence of both the aforementioned circumstances) at least one of their functions can be kept active. If a full shutdown occurs as a result of the detection of moisture, in the event of a first reoccurrence of power being drawn at least such partial circuit components which first check whether a moisture detection situation exists and which then control the appropriate further steps must be switched to an active state during the course of initial steps.

If the aforementioned feature has determined that both the relevant circumstances exist, for example, the same feature serves to ensure that a mode is activated causing the mobile communication terminal device, by drawing current, to be subject to a heating phase and in turn, a resultant drying phase. The drying phase is completed when the moisture detection yields a negative result. Only then does the mobile communication terminal device become capable of being fully powered up once again.

As long as the mobile communication terminal device remains unpowered, in spite of the presence of moisture, no electrolysis processes can take place in the device and, thus, for all practical purposes no corrosion processes can occur. If the device has been dried, even though there may no longer be an absence of power, moisture is not present, which means that it is not possible for any electrolysis processes to take place again. On the whole, the device is particularly well protected against corrosion in the proposed manner.

Accordingly, as far as possible, the elements for shutting down the mobile communication terminal device upon detection of discharged inserted power supply cells and the elements for indicating discharged power supply cells are incorporated into the shutdown element in each case. The benefit in this situation is the fact that no extra elements are required in order to realize these functions.

With the aid of the elements used for providing an indication of discharged inserted power supply cells, the shutdown of the mobile communication terminal device on account of moisture present in the mobile communication terminal device is represented to an outside observer as a shutdown resulting from a prevailing discharged state of the power supply cells inserted in the mobile communication terminal device.

A benefit of this protocol is the fact that the outside observer (i.e., the user of the mobile communication terminal device, in particular) will usually make an effort to keep fully charged power supply cells in his device and he will, therefore, as a matter of priority place the mobile communication terminal device into the charger unit supplied with the mobile communication terminal device for charging discharged power supply cells on seeing the indication for discharged power supply cells. In the charger unit, however, there is immediately sufficient electrical energy available in order to subject the device to a drying process by means of a heating process.

In this situation, an increased current does not necessarily need to be drawn because present devices will actually heat up during charging of the power supply cells. However, it is possible to design the device in such a way that it draws an increased current for drying the device in order to accelerate the drying process in this manner. In this context, moisture-dependent power consumption, accompanied by appropriate control of the drying process, would also be conceivable.

By using a processor control unit, the detection of the occurrence of the two circumstances, (i.e., that the mobile communication terminal device has at least partially been shut down as a result of moisture being detected and that the mobile communication terminal device has been connected to an external power supply source) can be implemented in a simple manner because currently available mobile communication terminal devices already have integrated processor control units and it is, therefore, easily possible to also accommodate an appropriate additional software facility for this detection in the mobile communication terminal device.

BRIEF DESCRIPTION OF THE DRAWINGS

The FIGURE illustrates an example of a mobile communication device constructed in accordance with the present disclosure.

DETAILED DESCRIPTION OF THE PRESENT EXAMPLES

The FIGURE illustrates a mobile communication terminal device 1. The mobile communication terminal device 1 includes elements 2 to detect discharged inserted power supply cells 3. It also includes elements 4 for shutting down the mobile communication terminal device 1 upon detection of discharged inserted power supply cells 3. In addition, the mobile communication terminal device 1 includes elements 5 for indicating the circumstance whereby the inserted power supply cells are discharged 3.

In the mobile communication terminal device 1, elements 6 are provided, for example, for the active detection of moisture located in the mobile communication terminal device 1. These elements 6 are preferably positioned at points where corrosion phenomena are likely to make themselves apparent. These points include the area of the keypad in particular. Such elements 6 are therefore provided in the area of the keypad in accordance with the illustrated example.

It is possibly sufficient to employ elements 6 for the detection of moisture at a single point in the mobile communication terminal device 1. Optionally, however, elements 6 for the detection of moisture can be provided at further points in the mobile communication terminal device 1. In the present example, elements 6 for the detection of moisture are provided at one further point in the area of the display.

The elements 6 are part of a further precautionary feature, which is used to control the elements 6. With regard to the elements 6, these are, for example, moisture sensors that experience physical changes depending on the moisture level prevailing in their environment and convert these into an electrical variable that can also be further converted into a data processing variable. In this manner, it is ultimately possible to carry out an overall data processing evaluation of the signals generated by the elements 6 depending on the moisture level prevailing in their environment.

In the mobile communication terminal device 1, a memory feature 8 is provided that permits recording of the circumstances under which the detection of moisture takes place in a manner suitable for data processing, for example. In addition, a shutdown feature 9 is provided permitting at least a partial shutdown of the mobile communication terminal device 1 when a positive moisture detection result has been returned.

In the mobile communication terminal device 1, a feature 10 is also provided that is suitable for determining the two circumstances (i.e., that an at least partial shutdown of the mobile communication terminal device 1 has been performed as a result of moisture being detected and that the mobile communication terminal device 1 has been connected to an external power supply source). In addition, the feature 10 is suitable for switching the mobile communication terminal device 1 to a special mode if it has determined that the two aforementioned circumstances exist simultaneously. The special mode is a mode by means of which the mobile communication terminal device 1 is subjected to a heating phase by drawing current and, as a result, is in turn subjected to a drying phase.

As supplementary equipment for the mobile communication terminal device 1, the FIGURE shows a charger unit 11, which, for its part, can be connected to a power supply network. This power supply network is not shown in detail in the FIGURE.

A situation is illustrated in the FIGURE in which the elements 6 in conjunction with the feature 7 have determined moisture in the mobile communication terminal device 1. This positive moisture detection result is recorded in the memory feature 8 in a form that can be used for data processing purposes. At the same time, the elements 5 are used to indicate the circumstance where the inserted power supply cells 3 are discharged. In addition, the mobile communication terminal device 1 is at least partially shut down by the elements 4 and/or elements 9 as a result of the positive moisture detection result. At a convenient opportunity the mobile communication terminal device 1 is therefore placed into the charged unit 11 for supposed charging of the supposedly discharged power supply cells 3.

The feature 10 now detects the two circumstances, namely that an at least partial shutdown of the mobile communication terminal device 1 has been performed as a result of moisture being detected and that the mobile communication terminal device 1 has been connected to an external power supply source, and switches the mobile communication terminal device 1 to the mode by means of which the mobile communication terminal device 1 is subjected to a heating phase by drawing current and as a result is, in turn, subjected to a drying phase. The mobile communication terminal 1 is operable once again after the drying phase.

The heating phase or drying phase is represented stylistically in the FIGURE by a schematic thermometer that gives an indication of an increase in the body temperature of the mobile communication terminal device 1. The thermometer itself is otherwise not part of the arrangement.

The FIGURE also illustrates by means of two double arrows that the respective elements 4 and 5 can be functionally included in the shutdown feature 9 in such a way that shared use can be made of their functions and that they do not need to be implemented again as extra facilities.

Although preferred examples of the present methods and apparatus have been disclosed for illustrative purposes, those of ordinary skill in the art will appreciate that the scope of this patent is not limited thereto. On the contrary, this patent covers all methods and apparatus falling within the scope of the appended claims.

The invention claimed is:

1. For use in a mobile communication terminal, an apparatus comprising:
   a moisture detection element configured to detect moisture in the mobile communication terminal device;
   a memory to record circumstances under which the detection of moisture takes place;
   a first shutdown element configured to at least partially shut down the mobile communication terminal device when moisture has been detected; and
   a control element configured to determine a first event where an at least partial shutdown of the mobile communication terminal device has been performed by the first shutdown element as a result of moisture being detected, and a second event where the mobile communication terminal device is connected to a charger unit and current is being drawn from the charger unit; and, upon detection of the first and second events, activate a mode to cause the mobile communication terminal device through the drawing of current to be subjected to a heating phase and a subsequent drying phase.

2. An apparatus as defined in claim 1 further comprising:
   a detector configured to detect discharged power supply cells connected to the mobile communication terminal;
   a second shutdown element configured to shut down the mobile communication terminal device on detection of connected discharged power supply cells; and
   an indication element configured to indicate that the connected power supply cells are discharged.

3. An apparatus as defined in claim 2, wherein the second shutdown elements and the indication element are incorporated with the first shutdown element; and
   shutdown of the mobile communication terminal device when moisture is detected is displayed to an outside observer by the indication element as a shutdown resulting from a discharged state of the connected power supply cells.

4. An apparatus as defined in claim 1, wherein the control element includes a processor control unit for carrying out the determination of these circumstances.

5. For use in a mobile communication terminal, an apparatus comprising:
   a moisture detection element configured to detect moisture in the mobile communication terminal device;
   a memory to record circumstances under which the detection of moisture takes place;
   a first shutdown element configured to at least partially shut down the mobile communication terminal device when moisture has been detected;
   a control element configured to determine a first even where an at least partial shutdown of the mobile communication terminal device has been performed by the first shutdown element as a result of moisture being detected, and a second even where the mobile communication terminal device is connected to an external power supply source and current is being drawn from the power supply source; and, upon detection of the first and second events, activate a mode to cause the mobile communication terminal device through the drawing of current to be subjected to a heating phase and a subsequent drying phase;

a detector configured to detect discharged power supply cells connected to the mobile communication terminal;

a second shutdown element configured to shut down the mobile communication terminal device on detection of connected discharged power supply cells; and an indication element configured to indicate that the connected power supply cells are discharged.

6. An apparatus as defined in claim 5, wherein the second shutdown elements and the indication element are incorporated with the first shutdown element; and shutdown of the mobile communication terminal device when moisture is detected is displayed to an outside observer by the indication element as a shutdown resulting from a discharged state of the connected power supply cells.

* * * * *